Nov. 5, 1946.　　　　E. J. DOBERSTEIN　　　　2,410,481
SHAKER CONVEYER
Filed Sept. 7, 1945　　　　2 Sheets-Sheet 1
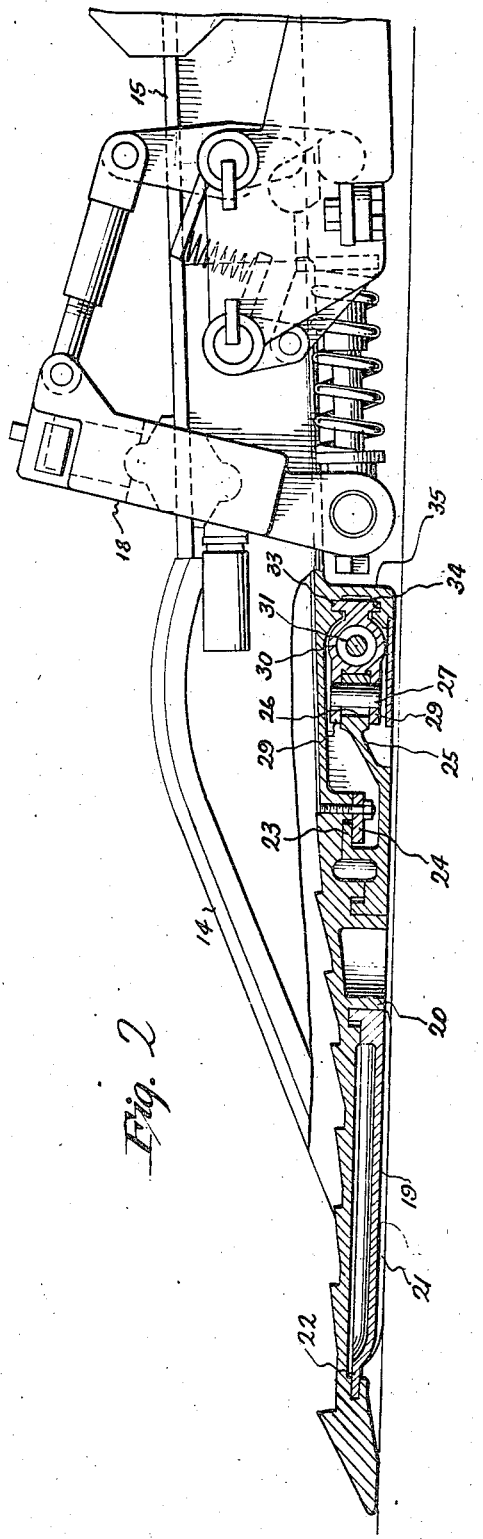
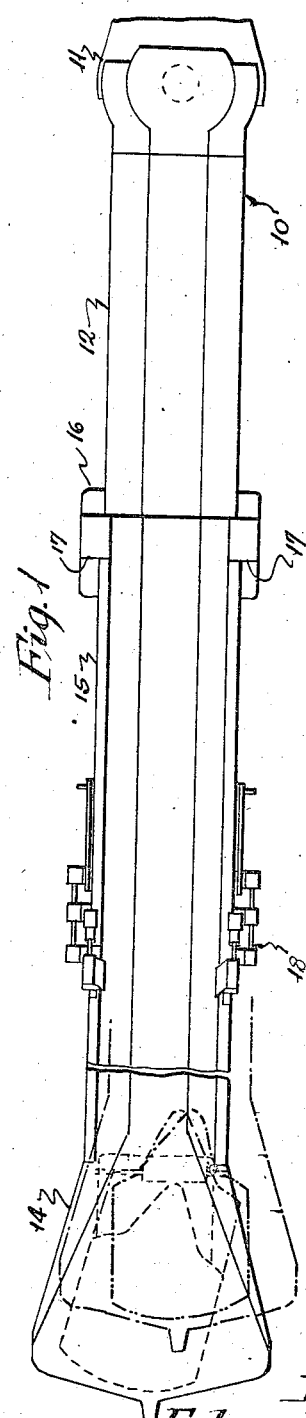
INVENTOR
Edward J. Doberstein
Clarence F. Poole
ATTORNEY Nov. 5, 1946.   E. J. DOBERSTEIN   2,410,481
SHAKER CONVEYER
Filed Sept. 7, 1945   2 Sheets-Sheet 2

INVENTOR
Edward J. Doberstein
Clarence F. Poole
ATTORNEY

Patented Nov. 5, 1946

2,410,481

UNITED STATES PATENT OFFICE 2,410,481

SHAKER CONVEYER

Edward J. Doberstein, Blue Island, Ill., assignor to Goodman Manufacturing Company, Chicago, Ill., a corporation of Illinois Application September 7, 1945, Serial No. 614,859

7 Claims. (Cl. 198—14)

This invention relates to improvements in shaker conveyers and more particularly relates to a new and improved means for laterally moving the pick-up end of a shaker conveyer.

The principal object of my invention is to provide an efficient and simplified form of self-contained means of a novel construction, which is selectively operable to guide the pick-up end of a shaker conveyer to move in a lateral direction about a vertical swivel during movement of said pick-up end of said shaker conveyer along the ground in substantially the direction of its longitudinal axis.

This and other objects of my invention will appear from time to time as the following specification proceeds and with reference to the accompanying drawings wherein:

Figure 1 is a plan view of the inby end of a shaker conveyer trough line showing a device constructed in accordance with my invention embodied in the pick-up end thereof;

Figure 2 is an enlarged view in side elevation of the inby end of a shaker conveyer trough line, with certain parts of the pick-up member or shovel on the end thereof broken away, and certain other parts shown in substantially longitudinal section in order to illustrate certain details of my invention;

Figure 3:
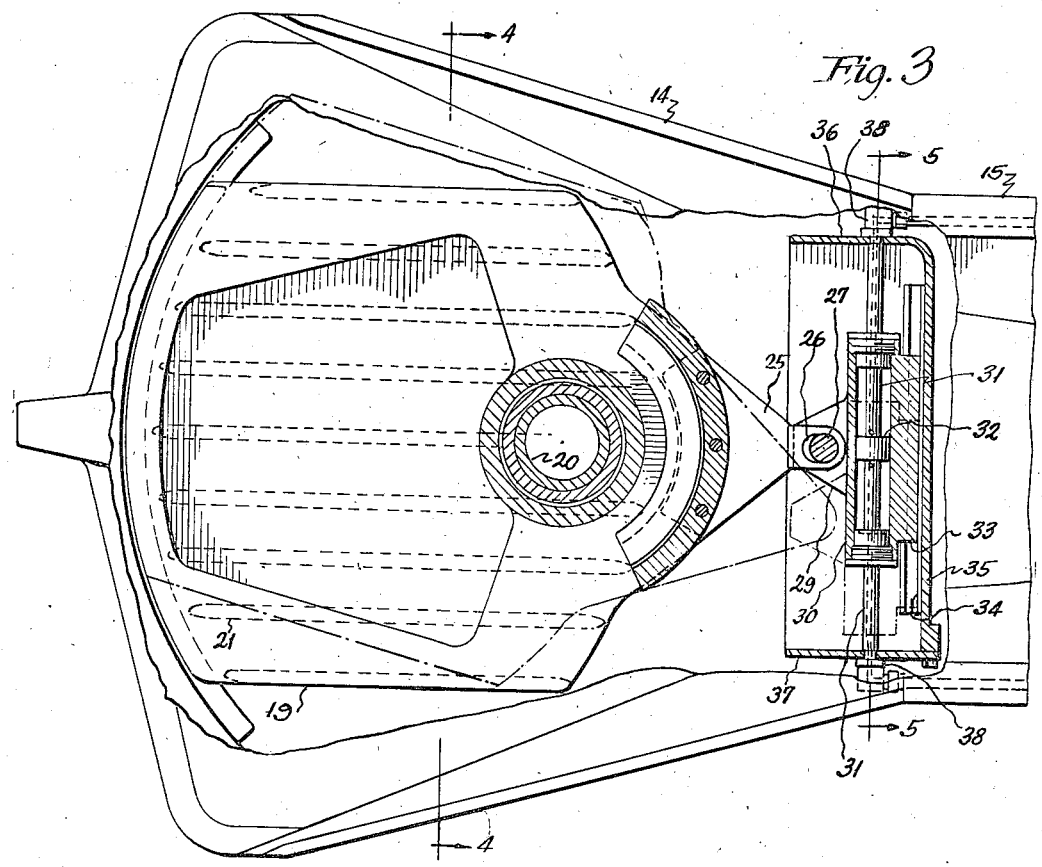
Figure 3 is a plan view drawn to substantially the same scale as Figure 1, with certain parts of the shovel broken away and certain other parts shown in horizontal section in order to show certain other details of my invention which are not shown in Figure 2.
Figure 4:
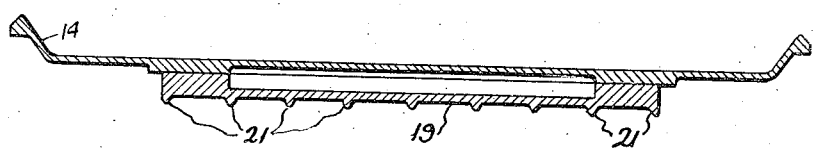
Figure 4 is a transverse sectional view taken substantially along line 4—4 of Figure 3.
Figure 5:
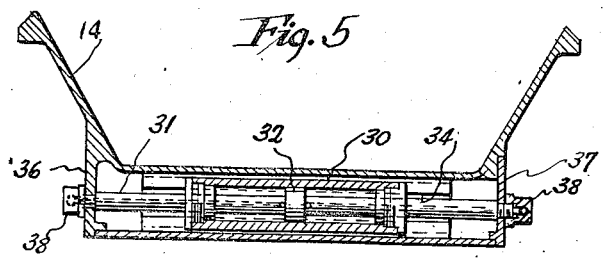
Figure 5 is a transverse sectional view taken substantially along line 5—5 of Figure 3.

In the embodiment of my invention illustrated in the drawings, a shaker conveyer trough line indicated generally by reference character 10 is shown in Figure 1. Said trough line is reciprocably driven at its outby end from a shaker conveyer drive mechanism (not shown) in a manner well known to those skilled in the art, for moving material from the inby to the outby end thereof by the reciprocable motion of said trough line. Said trough line includes a swivel trough 11 having a reciprocating trough 12 pivotally connected to its forward end for lateral movement along the ground about the axis of said swivel. Said swivel trough is so arranged as to permit the continuous flow of material along said reciprocating and swivel troughs to the outby end of the trough line when the forward end of said reciprocating trough is in various positions of lateral displacement with respect to the trough line.

A pick-up member or shovel 14 forms a forward continuation of the forward end of an extensible trough 15, which extensible trough is mounted for extensible or retractible movement with respect to said reciprocating trough. Said extensible trough 15 is mounted on a ground engaging shoe 16 adjacent its rear end on legs 17, 17 extending along opposite sides of said reciprocating trough and supporting the rear end of said extensible trough in discharge relation with respect to said reciprocating trough as it is extensibly or retractibly moved therealong. The forward end of said extensible trough is supported on the shovel 14 resting on the ground.

A friction grip feeding mechanism 18 mounted on the forward end of the reciprocating trough 12 and extending in advance thereof, is adapted to be moved into engagement with said extensible trough during alternate strokes of the conveyer, for extensibly or retractibly moving said extensible trough with respect to said reciprocating trough in a manner well known to those skilled in the art. Said feeding mechanism is herein shown as being of a form similar to that illustrated in the Sloane Patent No. 2,318,808, dated May 11, 1943, so need not herein be shown or described in detail.

Referring now to the means for guiding the shovel 14 and extensible trough 15 to move laterally about the axis of the swivel 11, during movement of said shovel and extensible trough along the ground in a direction extending generally longitudinally thereof, a ground engaging shoe 19 is mounted on the underside of said shovel for pivotal movement with respect thereto, about an upright axis, on a boss 20, herein shown as depending from and as being formed integrally with the bottom of said shovel. Said shoe is relatively wide, to provide a wide bearing area and to form a wide support for said shovel on the ground, and is provided with a plurality of longitudinally extending ribs or runners 21, 21 slidable along the ground, to guide said shoe and shovel for movement along the ground. The forward end of said shoe is formed on an arc struck from the center of the boss 20 and is in the form of a lip 22 spaced upwardly from the ground and has slidable engagement with an arcuate groove opening towards said shoe and formed integrally with the underside of the forward portion of the shovel 14.

The shoe 19 is also provided with an arcuate lip 23 spaced upwardly from the bottom thereof and rearwardly of the boss 20, which extends in a rearward direction and is struck on an arc, the center of which is coaxial with the center of said boss. Said lip abuts the underside of the shovel 14 and is abutted at its underside by an arcuate retaining segment 24 detachably secured to the bottom of said shovel.

An arm extends rearwardly from the pivotal axis of the shoe 19 and is herein shown as being formed integrally therewith. Said arm has a slot 26 at its rear end, which is engaged by a pin 27 mounted on its ends in parallel spaced ears 29, 29 projecting forwardly from the wall of a cylinder 30. Said cylinder is mounted on a piston rod 31 having a piston 32 thereon, and is slidably movable along said piston rod. Said cylinder has a rearwardly projecting guide 33 extending parallel to the axis thereof, which is slidably guided in a gibbed guide 34 formed in a rear wall 35 of said shovel, and extending forwardly therefrom.

Opposite ends of the piston rod 31 are shouldered and one end thereof is mounted in a side wall 36 depending from the bottom of the shovel 14 and forming a right angle continuation of the rear wall 35. The opposite end of said piston rod is mounted in an end wall 37 detachably secured to the end of the rear wall 35 opposite from the wall 36. The shoulders of said shouldered ends of said piston rod abut the insides of said walls and the ends of said piston rod have fittings 38, 38 threaded thereon. Said piston rod is drilled from opposite ends thereof to positions adjacent opposite sides of said piston, and the drilled portions of said piston rod open to opposite sides of said piston, so fluid may be admitted through said piston rod to either end of said cylinder, to move said cylinder along said piston rod and thus move the shoe 19 about the axis of the boss 20 in an obvious manner.

A suitable fluid pump and storage tank (not shown) may be provided to supply fluid under pressure to the cylinder 30 and suitable valves (not shown) may be provided to control the admission of fluid under pressure to either end of said cylinder, to pivotally move the shoe 19 about the axis of the boss 20 in one direction or another, depending upon the direction it is desired to move the shovel.

When it is desired to swing the shovel laterally in one direction about the swivel trough 11, fluid under pressure may be admitted to one end of the cylinder 30 to pivot the shoe 19 so the ribs 21, 21 extend in the angular direction it is desired to swing. During extensible movement of the extensible trough 15, the ribs or runners 21, 21 being at an angle to the longitudinal center line of said trough will guide said trough in the direction of said runners to move said trough and the reciprocating trough 12 laterally during the extension or retraction of said extensible trough.

The extensible trough 15 may also be swung laterally by admitting fluid under pressure to one end of the cylinder 30 during the forward strokes of the conveyer to position said shoe in one angular position with respect to the longitudinal center line of said trough during the forward strokes of the conveyer, and by admitting fluid under pressure to the opposite end of said cylinder during the return strokes of the conveyer, to move said shoe to an opposite angular position during the return strokes of the conveyer.

The valves for controlling the admission and release of fluid under pressure to opposite ends of said cylinder may be operated by hand or may be operated by the action of the conveyer in any well known manner, if desired.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a device for swinging the pick-up end of a shaker conveyer laterally along the ground, a trough mounted on the ground at its forward end for reciprocable movement with respect thereto, a shoe on the underside of said trough extending longitudinally thereof and forming a support for the forward end of said trough on the ground, and means selectively operable for moving said shoe at an angle with respect to the longitudinal center line of said trough to position said shoe to guide the forward end of said trough laterally with respect to the conveyer during movement of said trough and shoe in a forward direction.

2. In a device for swinging the pick-up end of a shaker conveyer laterally along the ground, a trough mounted on the ground at its forward end for reciprocable movement with respect thereto, a shoe on the underside of said trough extending longitudinally thereof and forming a support for the forward end of said trough on the ground, and fluid pressure means mounted on said trough and having operative connection with said shoe for moving said shoe at an angle to said trough, to position said shoe to guide the forward end of said trough in a lateral direction along the ground during movement of said trough and shoe in a forward direction.

3. In a device for swinging the pick-up end of a shaker conveyer laterally along the ground, a trough mounted on the ground at its forward end for reciprocable movement with respect thereto, a shoe pivotally mounted on the underside of said trough and extending longitudinally thereof and forming a slidable support for the forward end of said trough on the ground, and means selectively operable to move said shoe about its pivot, to cause the forward end of said trough to swing laterally by frictional resistance of said shoe against the ground during movement of said trough and shoe along the ground.

4. In a device for swinging the pick-up end of a shaker conveyer laterally along the ground, a trough mounted on the ground at its forward end for reciprocable movement with respect thereto, a shoe on the underside of said trough and extending longitudinally thereof, and forming a slidable support for the forward end of said trough on the ground, a pivotal mounting between the underside of said trough and said shoe, mounting said shoe for movement into various angular positions with respect to the longitudinal center line of said trough, and power means selectively operable to move said shoe about its pivot, to position said shoe to cause the forward end of said trough to move in a lateral direction along the ground during movement of said trough and shoe along the ground in a longitudinal direction.

5. In a device for swinging the pick-up end of a shaker conveyer laterally along the ground, a trough mounted on the ground at its forward end for reciprocable movement with respect thereto, a shoe having ground engaging means on the underside thereof engageable with the ground and normally extending in a direction longitudinally of said trough for guiding said shoe for movement along the ground in the direction of said ground engaging means, said shoe forming a slidable support for the forward end of said trough on the ground, a pivotal connection between the underside of said trough and said shoe, mounting said shoe on the underside of said trough for movement about an upright axis, and means operatively connected with said shoe and selectively operable to move said shoe about its pivot, to position said ground engaging means at an angle extending to either side of said trough, to cause said trough to swing laterally by movement of said trough and shoe along the ground in a generally longitudinal direction.

6. In a device for moving the pick-up end of a shaker conveyer laterally along the ground, a reciprocating trough connected adjacent its rear end to a shaker conveyer trough line for movement about an upright axis, an extensible trough mounted for extensible or retractible movement with respect to said reciprocating trough and having a shovel communicating with its forward end, a shoe mounted beneath said shovel for pivotal movement about an upright axis and extending in a direction generally longitudinally of said troughs and shovel, and power means selectively operable for moving said shoe about said upright axis to position said shoe at an angle with respect to said trough, to cause said shoe to guide said shovel and troughs to move about the axis of pivotal connection of said reciprocating trough to the shaker conveyer trough line upon movement of said shoe and extensible trough in a generally longitudinal direction.

7. In a device for moving the pick-up end of a shaker conveyer laterally along the ground, a reciprocating trough connected adjacent its rear end to a shaker conveyer trough line for movement about an upright axis, an extensible trough mounted for extensible or retractible movement with respect to said reciprocating trough and having a shovel on its forward end, a shoe mounted beneath said shovel for pivotal movement about an upright axis and extending in a direction generally longitudinally of said troughs and shovel, and fluid pressure means having operative connection with said shoe and selectively operable to move said shoe about said upright axis during alternate strokes of the conveyer, to position said shoe at an angle with respect to said trough, to cause said shoe to guide said pick-up member and troughs to move about the axis of pivotal connection of said reciprocating trough to the shaker conveyer trough line upon movement of said shoe and extensible trough in a generally longitudinal direction.

EDWARD J. DOBERSTEIN.